No. 783,503.　　　　　　　　　　　　　　　　　　　　PATENTED FEB. 28, 1905.
W. H. BRISTOL.
TEMPERATURE COMPENSATING DEVICE FOR THERMO ELECTRIC MEASURING INSTRUMENTS.
APPLICATION FILED DEC. 15, 1904.

Witnesses
Geo. W. Eisenbrauk
Raena A. Yudifky

William H. Bristol, Inventor
By His Attorney Fred'k F. Schuetz

No. 783,503. Patented February 28, 1905.

UNITED STATES PATENT OFFICE.

WILLIAM H. BRISTOL, OF NEW YORK, N. Y.

TEMPERATURE-COMPENSATING DEVICE FOR THERMO-ELECTRIC MEASURING INSTRUMENTS.

SPECIFICATION forming part of Letters Patent No. 783,503, dated February 28, 1905.

Application filed December 15, 1904. Serial No. 237,026.

*To all whom it may concern:*

Be it known that I, WILLIAM H. BRISTOL, a citizen of the United States of America, residing at New York city, in the county of New York and State of New York, have invented certain new and useful Improvements in Temperature-Compensating Devices for Thermo-Electric Measuring Instruments, of which the following is a specification.

My invention has reference to electrical means for measuring temperatures by means of thermo-electric couples, and has for its particular object to dispense with the cumbersome means for maintaining the cold or outer ends of such couples at a constant temperature.

For this purpose my invention consists, essentially, of an automatic temperature-compensating device, such as shown and described in my prior patent, No. 776,491, connected in series in the circuit and located in close proximity to the cold or outer ends of said thermo-electric couple.

The nature of my invention will best be understood when described in connection with the accompanying drawings, in which—

Figure 1:
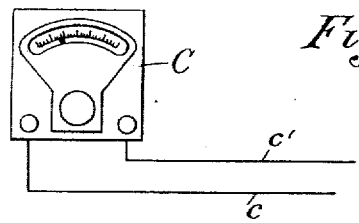
Figure 1:
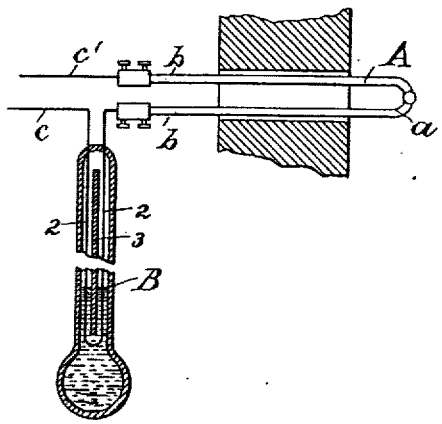
Figure 2:
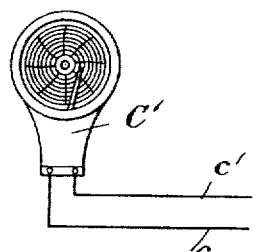
Figure 2:
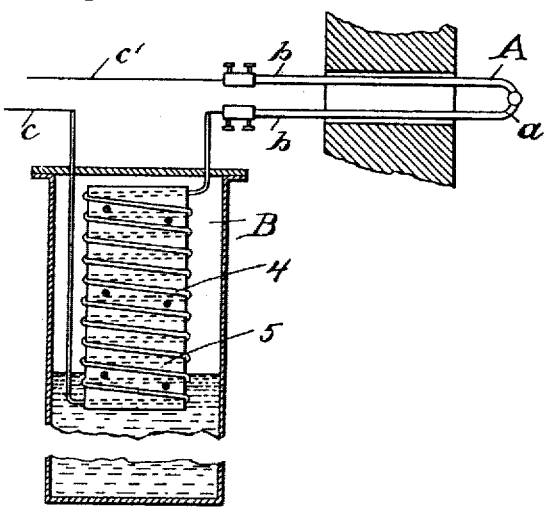

Figures 1 and 2 are diagrammatic views of the arrangement of the various apparatus.

Similar letters and numerals of reference designate corresponding parts throughout both the views.

Referring now to Figs. 1 and 2, A is a thermo-electric couple as used in pyrometers or thermometers where the temperature is measured or indicated by proper means due to voltage generated by the said couple.

B is an automatic temperature-compensating device, such as described in my prior patent, No. 776,491.

C is an indicating, and C' a recording, instrument of the usual construction, indicating or recording the temperature to which the pyrometer or thermometer is subjected.

$c$ and $c'$ are connecting-conductors.

The voltage generated by a thermo-electric couple such as would be employed for a pyrometer is practically directly proportional to the difference in temperature between the so-called "hot" and "cold" ends $a$ and $b$. In measuring the temperature of the hot end $a$ a recording apparatus C' or indicating apparatus C is used, which directly records or gives an indication due to the voltage set up by the couple A. As the voltage is proportional to the difference of temperature between the hot and cold ends, it is very evident that the cold ends $b$ must be kept at a constant temperature or an equivalent compensation provided for to obtain correct indications at the instruments C or C'. At present a cooling fluid or other means for maintaining a constant temperature is provided at the cold ends $b$. This is a very cumbersome and expensive method and does not give entire satisfaction. In my invention I dispense entirely with any cooling means or means to maintain a constant temperature and allow the temperature at the cold ends to be what it may according to the surrounding conditions. However, I insert into one of the conductors or into both conductors, if necessary, leading from the cold ends to the measuring instrument and in close proximity to the said cold ends the compensating device B, Figs. 1 and 2.

The compensating device (shown in Fig. 1) consists of a thermometer in the shank of which is a wire, rod, or filament 2 in the form of a loop, the two members of which are separated from each other by an insulating-partition 3. One end of this loop is placed in connection with the cold end $b$ of the couple A, and the other end connects with the conductor $c$, directly connected to the indicating or recording instrument. The bulb of the thermometer is filled, as usual, with a fluid, such as mercury, offering a cross-section of high conductivity as compared with the wire, rod, or filament 2.

When it is desired to throw in or out a large resistance with comparatively small change in the height of the mercurial column, I make use of the construction shown in Fig. 2. The compensating device B in this case consists of a thermometer provided with a bulb of considerable length and width and the shank is formed to correspond, thus permitting the insertion of a coil 4 into the shank. This coil may consist of a large number of windings or convolutions about a core 5, of non-conducting material—such, for instance, as mica—so as to insulate the windings from each other. The terminals of the coil are connected as before, the one with the cold end $b$, the other with the recording instrument $C'$.

It will be readily understood that as the mercury rises and falls with variations in temperature a corresponding portion of the wire, rod, or filament will in both forms be short-circuited, or vice versa, thus decreasing or increasing the resistance in accordance with the length of the wire, rod, or filament that is immersed. In both devices the increments of resistance cut in or cut out are such that the change in voltage of the couple due to the variation in temperature at the cold ends $b$ will be compensated for by the variation of the resistance of the compensating device B. For example, if the hot end $a$ of the couple A were located at a point where the temperature were constant and if the indicating or recording instrument C or C' had been calibrated for a temperature at the cold ends $b$ of 75°, so that the indications or records would be correct for that temperature at the cold ends, then it is evident that should the temperature at the cold ends change the indication or record would be incorrect. Let it be assumed that such a change does take place and that the temperature of the cold end rises from 75° to 100°. The voltage generated by the couple A would then be diminished, since the difference in temperature between the cold and the hot ends of the couple A is diminished. In order that this diminished voltage shall produce the same current (that due to the voltage generated by the original difference of temperature between the hot and the cold ends) through the indicating or through the recording device, it is necessary to diminish the resistance of the circuit by an amount proportional to the drop of voltage. For this purpose I insert in series into the circuit and in close proximity to the cold ends of the couple the compensating device B or a device of a similar character. As the temperature rises the mercury expands and short-circuits a portion of the resistance-wire, thereby reducing the total resistance of the circuit, and thus compensating for the drop of voltage due to the decreased difference of temperature between the hot and the cold ends. In some cases where the variation of voltage is somewhat irregular it is of course necessary to so form the resistance-wire of the compensating device or the bore of the shank that these irregularities will be correctly compensated for.

What I claim as my invention, and desire to secure by Letters Patent, is—

1. The combination with a thermo-electric generator used as a pyrometer or thermometer and an indicating or recording instrument, of means for compensating for changes of temperature at the so-called cold or outer ends of said thermo-electric generator.

2. The combination with a thermo-electric generator used as a pyrometer or thermometer and an indicating or recording instrument, of a temperature-compensating device located in series in the circuit and in close proximity to the so-called cold or outer ends of said thermo-electric generator.

3. The combination with a thermo-electric generator used as a pyrometer or thermometer and an indicating or recording instrument, of a temperature-compensating device included in series in the circuit and located in close proximity to the so-called cold or outer ends of the said thermo-electric generator, the said compensating device consisting of a resistance in a liquid thermometric device.

In testimony whereof I have signed my name to this specification, in the presence of two subscribing witnesses, this 14th day of December, 1904.

WILLIAM H. BRISTOL.

Witnesses:
   A. FABER DU FAUR,
   RAENA H. YUDIZKY.